(12) United States Patent
Vander Lind

(10) Patent No.: US 9,709,026 B2
(45) Date of Patent: Jul. 18, 2017

(54) AIRFOIL FOR A FLYING WIND TURBINE

(71) Applicant: X Development LLC, Mountain View, CA (US)

(72) Inventor: Damon Vander Lind, Alameda, CA (US)

(73) Assignee: X Development LLC, Mountain View, CA (US)

( * ) Notice: Subject to any disclaimer, the term of this patent is extended or adjusted under 35 U.S.C. 154(b) by 647 days.

(21) Appl. No.: 14/145,550

(22) Filed: Dec. 31, 2013

(65) Prior Publication Data

US 2015/0184629 A1    Jul. 2, 2015

(51) Int. Cl.
*B64C 3/14*       (2006.01)
*F03D 1/02*       (2006.01)
(Continued)

(52) U.S. Cl.
CPC ................. *F03D 1/02* (2013.01); *B64C 3/14* (2013.01); *F03D 7/0232* (2013.01); *F03D 9/25* (2016.05);
(Continued)

(58) Field of Classification Search
CPC .......... F03D 1/00; F03D 1/002; F03D 1/0633; F03D 1/0641; F03D 3/061; F03D 9/002;
(Continued)

(56) References Cited

U.S. PATENT DOCUMENTS 2,518,854 A * 8/1950 Badenoch ................. B64C 9/20
244/216

3,092,354 A * 6/1963 Alvarez-Calderon .. B64C 23/08
244/10
(Continued)

FOREIGN PATENT DOCUMENTS

| AU | 2008202294 A1 * | 12/2008 | ............... F03D 5/06 |
| WO | 2013/104007 | 7/2013 | |
| ZA | WO 2011091448 A2 * | 7/2011 | ............ F03B 13/264 |

OTHER PUBLICATIONS

McGhee, Robert J. and Beasley, William D. "Effects on the Aerodynamic Characteristics of an Initial Low-speed Family of Airfoils for General Aviation Applications". NASA Technical Memorandum X-72843, Jun. 1976.*
(Continued)

*Primary Examiner* — Christopher Verdier
*Assistant Examiner* — Christopher R Legendre
(74) *Attorney, Agent, or Firm* — McDonnell Boehnen Hulbert & Berghoff LLP

(57) ABSTRACT

An airfoil for an airborne wind turbine including a main wing adapted for attachment to an electrically conductive tether, a pivotable trailing element positioned behind the main wing, wherein a chord line of the airfoil has a length that is measured from the leading edge of the main wing to a trailing edge of the trailing element, wherein when the main wing and trailing element are positioned in a first flying position, a slot gap exists between a trailing edge of the main wing and the leading edge of the trailing element, wherein the main wing has a thickness that is 15-28% of the length of the chord line; and wherein a spar bulge exists in the main wing such that 15-25% of the overall length of the chord line has a thickness that is 95% or more of a maximum thickness of the main wing.

17 Claims, 12 Drawing Sheets

(51) Int. Cl.
  *F03D 7/02* (2006.01)
  *F03D 9/25* (2016.01)
(52) U.S. Cl.
  CPC ......... *F05B 2240/921* (2013.01); *Y02E 10/72* (2013.01)
(58) Field of Classification Search
  CPC . F03D 7/0232; F03D 1/02; B64C 3/10; B64C 3/14; B64C 3/142; B64C 3/144; B64C 2003/142; B64C 2003/144; F05B 2240/92; F05B 2240/921; F05B 2240/922; F05B 2240/923
  See application file for complete search history.

(56) References Cited

U.S. PATENT DOCUMENTS

| | | | |
|---|---|---|---|
| 3,677,504 A * | 7/1972 | Schwarzler | B64C 23/005 244/212 |
| 3,952,971 A * | 4/1976 | Whitcomb | B64C 3/14 244/198 |
| 4,045,144 A | 8/1977 | Loth | |
| 4,251,040 A * | 2/1981 | Loyd | B64C 39/022 244/1 R |
| 4,428,711 A | 1/1984 | Archer | |
| 4,498,646 A * | 2/1985 | Proksch | B64C 3/14 244/216 |
| 5,236,149 A * | 8/1993 | MacKay | B64C 3/141 244/206 |
| 6,523,781 B2 | 2/2003 | Ragner | |
| 7,847,426 B1 | 12/2010 | Griffith et al. | |
| 7,992,827 B2 * | 8/2011 | Shepshelovich | B64C 3/14 244/215 |
| 8,393,870 B2 | 3/2013 | Nash et al. | |
| 8,393,872 B2 | 3/2013 | Kirtley | |
| RE44,313 E * | 6/2013 | Kelley-Wickemeyer | B64C 3/10 244/123.1 |
| 8,523,531 B2 | 9/2013 | Micheli et al. | |
| 8,763,959 B2 * | 7/2014 | Shepshelovich | B64C 3/14 244/130 |
| 2010/0295303 A1 | 11/2010 | Lind et al. | |
| 2011/0260462 A1 | 10/2011 | Vander Lind | |
| 2012/0104763 A1 | 5/2012 | Lind | |
| 2013/0221154 A1 | 8/2013 | Vander Lind et al. | |
| 2013/0221679 A1 | 8/2013 | Vander Lind | |
| 2015/0184629 A1 * | 7/2015 | Vander Lind | F03D 9/002 416/131 |
| 2015/0240780 A1 * | 8/2015 | Leonard | F03D 1/0675 416/204 R |

OTHER PUBLICATIONS

Steinbuch, M., Marcus, B., and Shepshelovich, M. "Development of UAV Wings—Subsonic Designs". 41st Aerospace Sciences Meeting and Exhibit, Jan. 2003.*
Sheidahl, Robert E. and Klimes, Paul C. "Aerodynamic Characteristics of Seven Symmetrical Airfoil Sections Through 180-Degree Angle of Attack for Use in Aerodynamic Analysis of Vertical Axis Wind Turbines", Sandia National Laboratories, Report SAND80-2114, Mar. 1981, p. 12.*
Abbott, Ira H., von Doenhoff, Albert E., and Stivers, Jr., Louis S. "Summary of Airfoil Data", National Advisory Committee for Aeronautics, Report No. 824, 1945, p. 101.*
Airfoil Pressures, "Airfoil Pressure Distributions," http://adg.standford.edu/aa241/airfoils/airfoilpressures.html accessed Nov. 22, 2013, 2 pages.
Virtual Skies: Aeronautics Tutorial: Motion, http://questarc.nasa.gov/aero/virtual/demo/aeronautics/tutorial/motion.html accessed Oct. 18, 2013, 4 pages.

* cited by examiner

US 9,709,026 B2

AIRFOIL FOR A FLYING WIND TURBINE

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy.

The use of wind turbines as a means for harnessing energy has been used for a number of years. Conventional wind turbines typically include large turbine blades positioned atop a tower. The cost of manufacturing, erecting, maintaining, and servicing such wind turbine towers, and wind turbines is significant.

An alternative to the costly wind turbine towers that may be used to harness wind energy is to use an aerial vehicle attached to a ground station with an electrically conductive tether. Such an alternative may be referred to as an Airborne Wind Turbine (AWT).

SUMMARY

An airfoil for an airborne wind turbine is provided that advantageously provides for high lift in low to moderate wind and low lift in high winds, and is suitable for both crosswind flight and hover flight. An electrically conductive tether may be attached to a main wing to transfer energy harnessed by the airfoil through the tether to a ground station. The airfoil includes a trailing element positioned behind the main wing that is pivotable about a pivot point which is positioned beneath a lower surface of the trailing element. A chord line of the airfoil has a length that is measured from a leading edge of the main wing to a trailing edge of the trailing element. When the main wing and trailing element are positioned in a first flying position, a slot gap exists between a trailing edge of the main wing and the leading edge of the trailing element. The main wing includes a spare bulge such that 15-25% of the overall length of the chord line has a thickness that is 95% or more of a maximum thickness of the main wing.

In another aspect, an airfoil for an airborne wind turbine is provided including a main wing adapted for attachment to an electrically conductive tether having a first end adapted for attachment to the main wing and a second end adapted for attachment to a ground station, a trailing element positioned behind the main wing and pivotable about a pivot point, wherein a chord line of the airfoil has a length that is measured from the leading edge of the main wing to a trailing edge of the trailing element, wherein when the main wing and trailing element are positioned in a first flying position, a slot gap exists between a trailing edge of the main wing and the leading edge of the trailing element, wherein the main wing includes a chord line having a length measured from the leading edge of the main wing to the trailing edge of the main wing, and wherein a spar bulge is positioned on a lower surface of the main wing that is shaped so that a secondary thickness of the main wing at a point that is located at a position that is 43% of the length of the chord line of the main wing is 95% or more of a maximum thickness of the main wing located closer to the leading edge of the main wing.

In another aspect, an airfoil for an airborne wind turbine is provided including a main wing adapted for attachment to an electrically conductive tether having a first end adapted for attachment to the main wing and a second end adapted for attachment to a ground station, a trailing element positioned behind the main wing and pivotable about a pivot point, wherein a chord line of the airfoil has a length that is measured from the leading edge of the main wing to a trailing edge of the trailing element, wherein when the main wing and trailing element are positioned in a first flying position a slot gap exists between a trailing edge of the main wing and the leading edge of the trailing element, and wherein the pivot point is located beneath a lower surface of the trailing element.

In another aspect, an airfoil for an airborne wind turbine is provided including a main wing adapted for attachment to an electrically conductive tether, a pivotable trailing element positioned behind the main wing, wherein a chord line of the airfoil has a length that is measured from the leading edge of the main wing to a trailing edge of the trailing element, wherein when the main wing and trailing element are positioned in a first flying position, a slot gap exists between a trailing edge of the main wing and the leading edge of the trailing element, wherein the main wing has a thickness that is 15-28% of the length of the chord line; and wherein a spar bulge exists in the main wing such that 15-25% of the overall length of the chord line has a thickness that is 95% or more of a maximum thickness of the main wing.

An airfoil is provided for an airborne wind turbine having means for providing high lift in low to moderate winds and means for providing low lift in high winds.

These as well as other aspects, advantages, and alternatives, will become apparent to those of ordinary skill in the art by reading the following detailed description, with reference where appropriate to the accompanying drawings.

DETAILED DESCRIPTION

Figure 1:
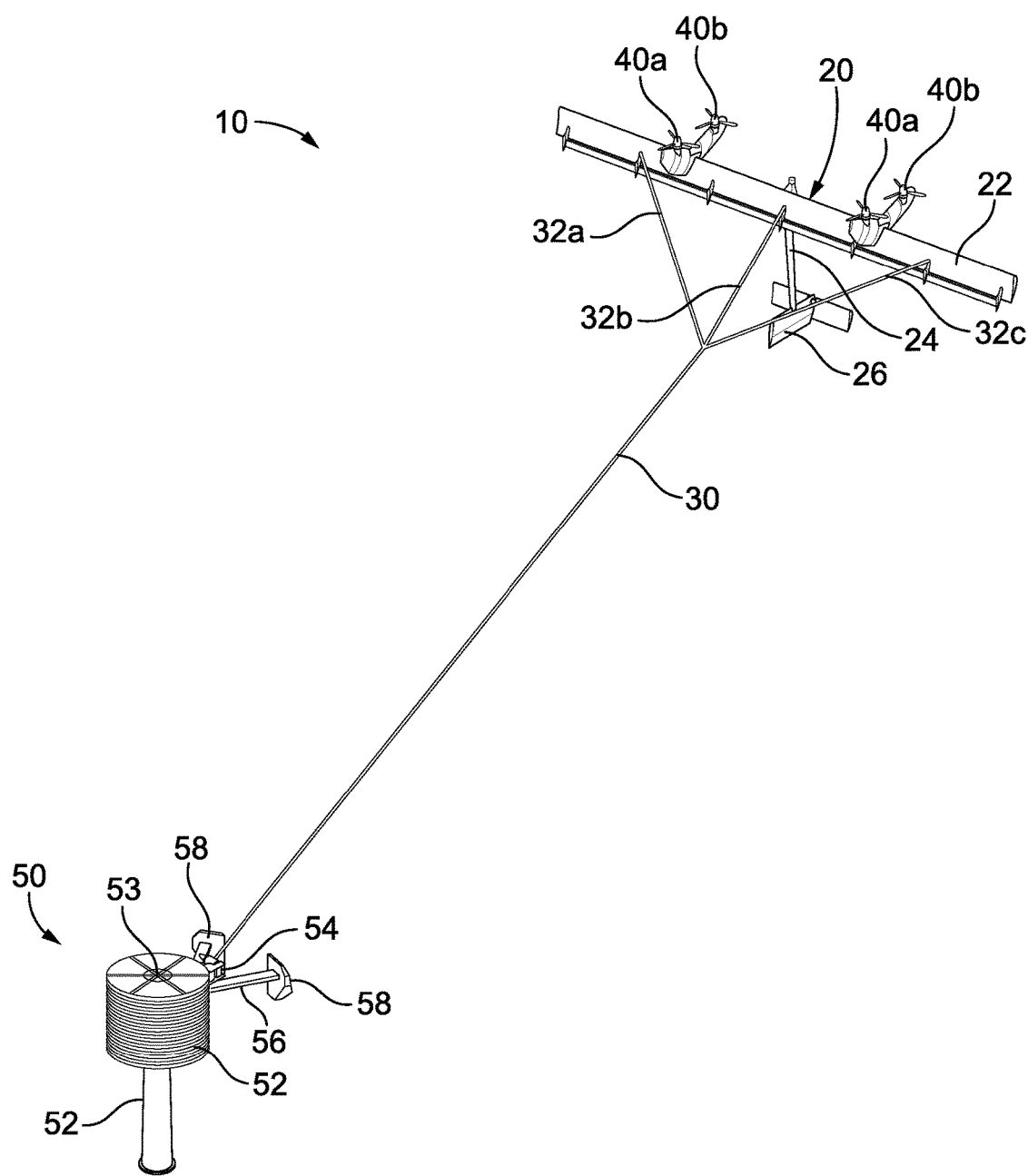
FIG. 1 is a perspective view of an airborne wind turbine 10 including aerial vehicle 20 attached to a ground station 50 with an electrically conductive tether 30, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

1. OVERVIEW

Example embodiments relate to aerial vehicles, which may be used in a wind energy system, such as an Airborne Wind Turbine (AWT). In particular, illustrative embodiments may relate to or take the form of methods and systems using an airborne vehicle that is attached to a ground station using an electrically conductive tether.

Wind energy systems, such as an AWT, may be used to convert wind energy to electrical energy. An AWT is a wind based energy generation device that may include an aerial vehicle constructed of a rigid wing with mounted turbines. The aerial vehicle may be operable to fly in a path across the wind, such as a substantially circular path, above the ground (or water) to convert kinetic wind energy to electrical energy. In such crosswind flight, the aerial vehicle flies across the wind in a circular pattern similar to the tip of a wind turbine. The rotors attached to the rigid wing are used to generate power by slowing the wing down. Air moving across the turbine blades forces them to rotate, driving a generator to produce electricity. The aerial vehicle is connected to a ground station via an electrically conductive tether that transmits power generated by the aerial vehicle to the ground station, and on to the grid.

When it is desired to land the aerial vehicle, the electrically conductive tether is wound onto a spool or drum in the ground station and drum is rotated to reel in the aerial vehicle towards a perch on the ground station. Prior to landing on the perch, the aerial vehicle transitions from a flying mode to a hover mode. The drum is further rotated to further wind the tether onto the drum until the aerial vehicle comes to rest on the perch.

To make power from the wind, an aerial vehicle having an airfoil which maximizes the equation $C\_L^3/C\_D^2$ is best, where $C\_L$ is the coefficient of lift and $C\_D$ is the coefficient of drag. This is the same performance metric as the minimum sink rate for a glider. However, airborne wind turbines are in a unique class because of the drag of the tether attached to the airfoil greatly increases the drag in the performance equation above, the desire to limit noise, and the importance of a having a low wing planform area during landing in high winds.

Furthermore, as noted above, in order to land the aerial vehicle, the aerial vehicle must first transition from a flying mode to a hover. This requires that the airfoil is used to intentionally stall the wing on landing. Accordingly, a new class of airfoils is required to take into account the performance constraints resulting from increased drag caused by the attached tether during cross wind flight and by the need for the airfoil to intentionally stall prior to landing.

Example embodiment may be directed to multi-element airfoil that may be used on an aerial vehicle used in an airborne wind turbine. The airfoil includes a main wing and a trailing element that pivots about a pivot point which may be located beneath the lower surface of trailing element. The main wing has a bulbous leading edge, with accelerated curvature to a transition point positioned on an upper surface of main wing. At the transition point, the curvature of the upper surface reduces suddenly to change the pressure gradient from a climbing pressure gradient, likely to maintain laminar flow, to a recovering pressure gradient, bringing pressure near the slot gap (between the trailing edge of the wing and the leading edge of the trailing element) back to trailing edge stagnation pressures.

The upper surface of the main wing includes an early recovery region that is shaped so as to have a highly concave pressure distribution having negative curvature over a segment of the upper surface of the main wing. In some embodiments, this recovery region is flat or convex. The early recovery region is followed by the final recovery region, in which the pressure gradient is convex or flat. This combination leads to a progressive stall on the main wing so as to result in a very gradual stall of the main wing while still using a Stratford or another concave pressure distribution for the majority of pressure recovery in the early recovery region. This combination results in a benign stall characteristic for the airfoil in the shallow stall regions, causing flow separation to grow gradually from the trailing edge forward, and to maintain a well-defined separation line at a given angle of attack.

The trailing element includes a blunt leading edge having a rounded shape resulting in only small pressure spikes at all relevant flap angles of the trailing element. In an example embodiment, the trailing element is designed at an optimum orientation for lift, and is deflected up only, or predominantly upward, during steering operations in flight. For example, a wing with 6 control surfaces (trailing elements) might have all surfaces at 0 degrees flap deflections, but might deflect the first or sixth control surface up if the wing is intended to roll left or roll right, respectively, while the opposite control surface might not be deflected down, or might not be deflected down to the same extent.

A unit chord line extends from the leading edge of the main wing to the trailing edge of the trailing element. In a first flying position, the unit chord line may not intersect the trailing element. The airfoil generates a high level of maximum lift. In an example embodiment, the maximum lift coefficient in a Reynolds number of 3 million and a mach number of 0.2 is between 3.3 and 4, while in some embodiments the maximum lift coefficient is closer to 2.2 to 2.7.

The main element also comprises a lower surface bulge which allows for a thicker spar to be located in the main wing while not significantly reducing the lift of the airfoil. The lower surface bulge is also shaped so as to allow a very low negative lift coefficient when the trailing elements are deflected upwards. The maximum thickness of main wing may be 15-25% of the length of the unit chord line. In some embodiments the maximum thickness may be 17-26% of the length of the unit chord line, and in an example embodiment may be 19-21% of the length of the unit chord line.

In high wind flight, the trailing element may be deflected upwards at an angle of 30 degrees by moving the trailing end of the trailing element upwards. By having an airfoil which maintains attached flow and no sharp curvature discontinuities when operating at a negative 30 degree trailing element deflection, the main wing may be trimmed out to have a low lift coefficient while maintaining the propellers pointing into the wind with no change in angle of attack. The pivot point about which the trailing element pivots is selected such that the moment about it is very small in comparison to the forces on the airfoil, and the chord of the main wing and of the trailing element. This allows a very small servo to be used to actuate the trailing element, and reduced power and torque may be used to move the trailing element. The pivot point is located such that a slot gap between the trailing end of the main element and a leading edge of the trailing element does not significantly change during small deflections (e.g. 0-40 degrees), though in some embodiments it may increase as the trailing element is deflected upwards.

When additional drag is desired, the trailing element may be deflected upwards an angle that is about 90 degrees. When the flying wind turbine is hovering, it is important that the main wing not generate lift force, and only drag force. In some embodiments, the slot gap may be closed when the trailing element is deflected up 90 degrees, while in others it is left slightly open. In a configuration with the slot gap open, it is hard to generate lift with the airfoil.

When the flying wind turbine transitions from hovering flight to transition in climb, the flow is suddenly switched from being detached to being attached. In this case, the trailing element is deflected from a highly negative (up) angle to the angle of the first flying position. The movement of the trailing member back to its position in the first flying position quickly moves the flow from being detached to being attached, reducing the amount of disturbance force potentially caused by the main wing unstalling asymmetrically or inconsistently. The reverse procedure is followed when transitioning from crosswind power generating flight to hovering flight.

An airfoil pressure distribution using a vertical pressure coefficient $C_p$ that increases negatively as it extends upward may be considered at a flight condition near stall. As $C_P$ is plotted against unit chord length, the main element pressure increases consistently from the leading edge of the main wing with a positive pressure gradient having a rounded shape until it reaches a pressure recovery at transition point where the flow becomes turbulent. The early pressure recovery is concave and holds the entirety of the boundary layer over this region at a similar margin to stall. The later pressure recovery is convex or flat, and leaves the further aft portions of the boundary layer closer to stall than those further forward. As lift is lost from the main wing when separation begins, the boundary layer thickness exiting the main element increases and results in a portion of offbody stall, resulting in a slow stall of the combined airfoil.

The trailing element pressure provides lift concentrated near the leading edge of the trailing element resulting in a generally triangular pressure distribution. The pressure distribution concentrates lift near the main wing, both reducing flap moments about the pivot point, and increasing the benefit of lift from the trailing element on the pressure on the main wing element, through reductions in the trailing edge stagnation pressure of the main element. In addition, by having a reflexed or low camber shape, the trailing element has a consistent center of effort over its range of motion, while flow is attached. This allows for a single pivot point to rotate the trailing element with consistent or small torques on the actuator rotating the trailing element. In some embodiments, the trailing element may be more cambered or less reflexed, but the pivot point may be moved upward to result in a consistent or small torque at the pivot point over a range of trailing element (flap) deflections.

The example embodiments are directed to a multi-element airfoil having a main wing and trailing element that may be used on a flying wind turbine. The design of the airfoil allows for a much smaller wing to be used, causing the forces in the parked condition to go down, and causing the forces in hover to go down. These factors combine to reduce the structural mass of the wing and increase controllability. The trailing element can move over a large range of angles while maintaining attached flow. This allows the airfoil to fly at vastly varying lift coefficients, which is highly valuable in high winds. Airfoil may operate at a 10-15 degree angle of attack for maximum lift, and may provide for high lift in low to moderate winds and low lift and more drag in high winds.

The placement of the transition point on the main wing results in an appropriate shape to fit the main wing spar near the center of effort of the airfoil, optimizing both structural and aerodynamic design. The lower surface bulge is placed at its location for this reason. The design of the airfoil makes for a smaller, higher performance wing capable of generating more power than lower zeta designs. The design of the airfoil also allows for a large amount of control over the forces on the main wing and increases the controllability of the airfoil in hover.

2. ILLUSTRATIVE AIRBORNE WIND TURBINES

Figure 2:
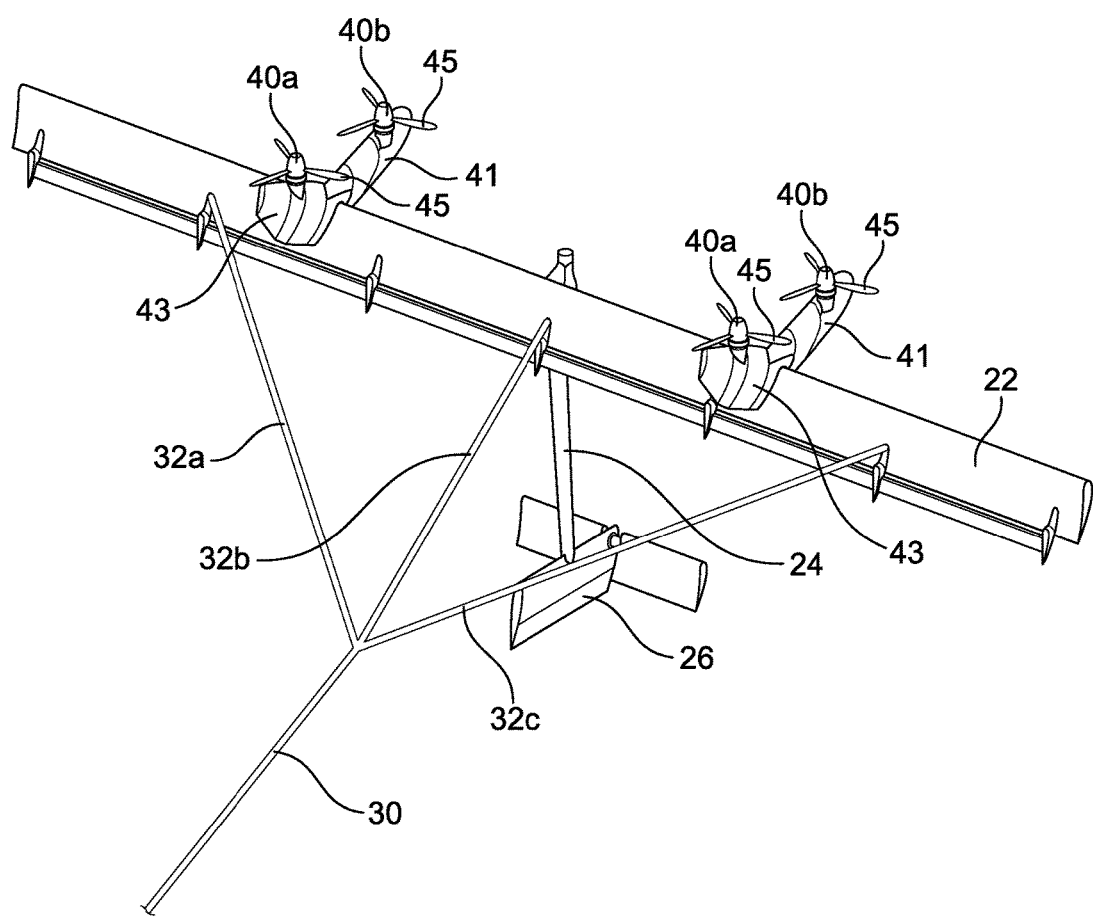
FIG. 2 is a close-up perspective view of aerial vehicle 20 shown in FIG. 1.

As disclosed in FIGS. 1-2, an airborne wind turbine (AWT) 10 is disclosed, according to an example embodiment. AWT 10 is a wind based energy generation device that includes an aerial vehicle 20 constructed of a rigid wing 22 with mounted turbines 40 that flies in a path, such as a substantially circular path, across the wind. In an example embodiment, the aerial vehicle may fly between 250 and 600 meters above the ground (or water) to convert kinetic wind energy to electrical energy. However, an aerial vehicle may fly at other heights without departing from the scope of the invention. In the cross wind flight, the aerial vehicle 20 flies across the wind in a circular pattern similar to the tip of a wind turbine. The rotors 40 attached to the rigid wing 22 are used to generate power by slowing the wing 22 down. Air moving across the turbine blades forces them to rotate, driving a generator to produce electricity. The aerial vehicle 20 is connected to a ground station 50 via an electrically conductive tether 30 that transmits power generated by the aerial vehicle to the ground station 50, and on to the grid.

As shown in FIG. 1, the aerial vehicle 20 may be connected to the tether 30, and the tether 30 may be connected to the ground station 50. In this example, the tether 30 may be attached to the ground station 50 at one location on the ground station 50, and attached to the aerial vehicle 20 at three locations on the aerial vehicle 2 using bridle 32a, 32b, and 32c. However, in other examples, the tether 30 may be attached at multiple locations to any part of the ground station 50 and/or the aerial vehicle 20.

The ground station 50 may be used to hold and/or support the aerial vehicle 20 until it is in an operational mode. The ground station may include a tower 52 that may be on the order of 15 meters tall. The ground station may also include a drum 52 rotatable about drum axis 53 that is used to reel in aerial vehicle 20 by winding the tether 30 onto the rotatable drum 52. In this example, the drum 52 is oriented vertically, although the drum may also be oriented horizontally (or at an angle). Further, the ground station 50 may be further configured to receive the aerial vehicle 20 during a landing. For example, support members 56 are attached to perch panels 58 that extend from the ground station 50. When the tether 30 is wound onto drum 52 and the aerial vehicle 20 is reeled in towards the ground station 50, the aerial vehicle may come to rest upon perch panels 58. The ground station 50 may be formed of any material that can suitably keep the aerial vehicle 20 attached and/or anchored to the ground while in hover flight, forward flight, or crosswind flight.

The tether 30 may transmit electrical energy generated by the aerial vehicle 20 to the ground station 50. In addition, the tether 30 may transmit electricity to the aerial vehicle 20 in order to power the aerial vehicle 20 during takeoff, landing, hover flight, and/or forward flight. The tether 30 may be constructed in any form and using any material which may allow for the transmission, delivery, and/or harnessing of electrical energy generated by the aerial vehicle 20 and/or transmission of electricity to the aerial vehicle 20. The tether 30 may also be configured to withstand one or more forces of the aerial vehicle 20 when the aerial vehicle 20 is in an operational mode. For example, the tether 30 may include a core configured to withstand one or more forces of the aerial vehicle 20 when the aerial vehicle 20 is in hover flight, forward flight, and/or crosswind flight. The core may be constructed of any high strength fibers or a carbon fiber rod. In some examples, the tether 30 may have a fixed length and/or a variable length. For example, in one example, the tether has a fixed length of 500 meters.

The aerial vehicle 20 may include or take the form of various types of devices, such as a kite, a helicopter, a wing and/or an airplane, among other possibilities. The aerial vehicle 130 may be formed of solid structures of metal, plastic and/or other polymers. The aerial vehicle 130 may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction. Other materials may be possible as well.

As shown in FIG. 1, and in greater detail in FIG. 2, the aerial vehicle 20 may include a main wing 22, rotors 40a and 40b, tail boom or fuselage 24, and tail wing 26. Any of these components may be shaped in any form which allows for the use of components of lift to resist gravity and/or move the aerial vehicle 20 forward.

The main wing 22 may provide a primary lift for the aerial vehicle 20. The main wing 22 may be one or more rigid or flexible airfoils, and may include various control surfaces, such as winglets, flaps, rudders, elevators, etc. The control surfaces may be used to stabilize the aerial vehicle 20 and/or reduce drag on the aerial vehicle 20 during hover flight, forward flight, and/or crosswind flight. The main wing 22 may be any suitable material for the aerial vehicle 20 to engage in hover flight, forward flight, and/or crosswind flight. For example, the main wing 20 may include carbon fiber and/or e-glass.

Rotor connectors 43 may be used to connect the upper rotors 40a to the main wing 22, and rotor connectors 41 may be used to connect the lower rotors 40b to the main wing 22. In some examples, the rotor connectors 43 and 41 may take the form of or be similar in form to one or more pylons. In this example, the rotor connectors 43 and 41 are arranged such that the upper rotors 40a are positioned above the wing 22 and the lower rotors 40b are positioned below the wing 22.

The rotors 40a and 40b may be configured to drive one or more generators for the purpose of generating electrical energy. In this example, the rotors 40a and 40b may each include one or more blades 45, such as three blades. The one or more rotor blades 45 may rotate via interactions with the wind and which could be used to drive the one or more generators. In addition, the rotors 40a and 40b may also be configured to provide a thrust to the aerial vehicle 20 during flight. With this arrangement, the rotors 40a and 40b may function as one or more propulsion units, such as a propeller. Although the rotors 40a and 40b are depicted as four rotors in this example, in other examples the aerial vehicle 20 may include any number of rotors, such as less than four rotors or more than four rotors, e.g. six or eight rotors.

Referring back to FIG. 1, when it is desired to land the aerial vehicle 20, the drum 52 is rotated to reel in the aerial vehicle 20 towards the perch panels 58 on the ground station 50, and the electrically conductive tether 30 is wound onto drum 52. Prior to landing on the perch panels 58, the aerial vehicle 20 transitions from a flying mode to a hover mode. The drum 52 is further rotated to further wind the tether 30 onto the drum 52 until the aerial vehicle 20 comes to rest on the perch panels 58.

Figure 3:
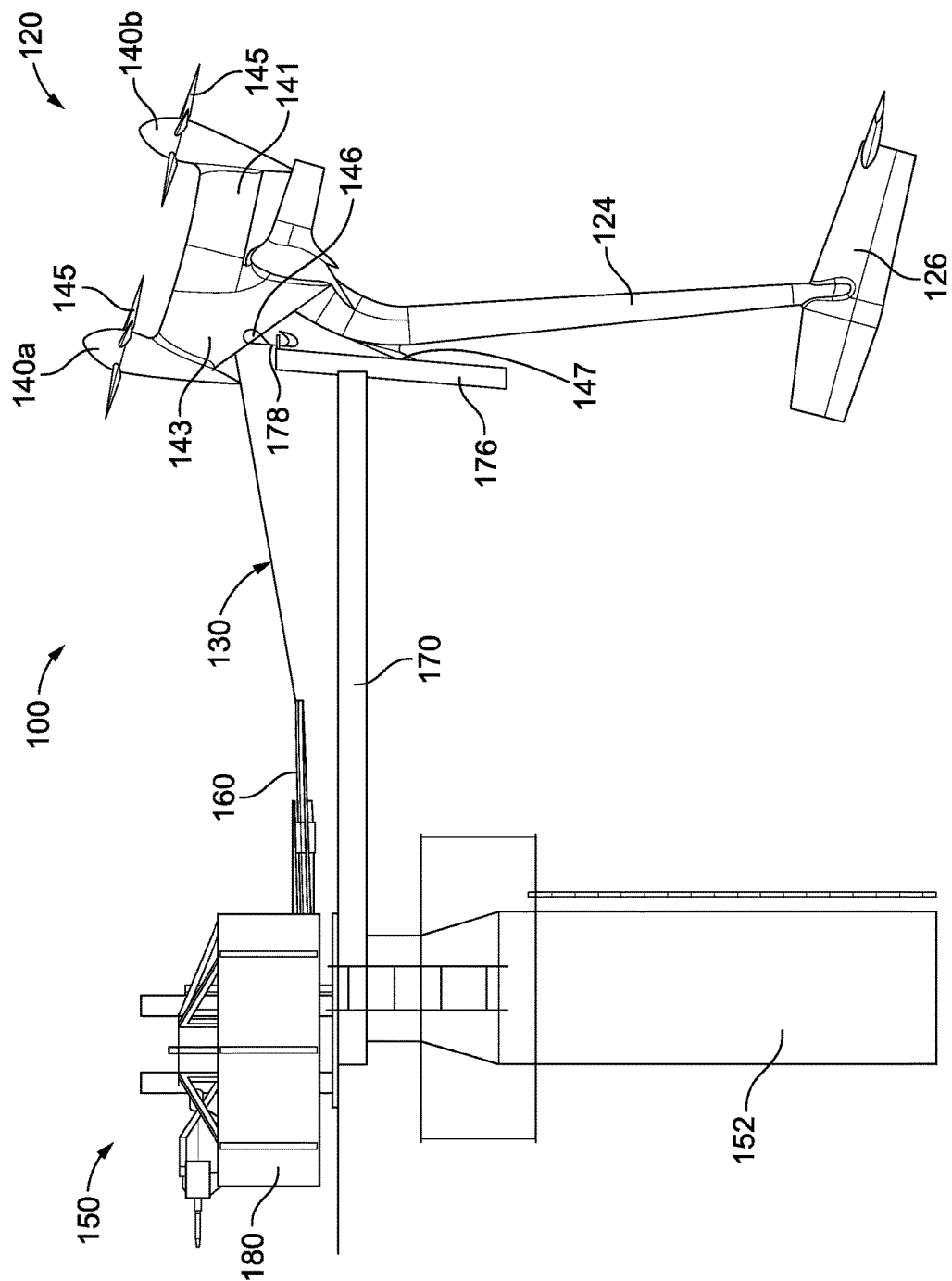
FIG. 3 is a side view of an aerial vehicle 120 positioned on a perch 176 on ground station 150, with an electrically conductive tether attached to a ground station 150 and to aerial vehicle 120, according to an example embodiment.

FIG. 3 shows an airborne wind turbine system 100 that includes aerial vehicle 120 and ground station 150. An electrically conductive tether 130 may be attached to lower pylons 143 and also to drum ground station 150. Ground station 150 includes a tower 152 that supports a drum 180 and a levelwind 160 which is used to wind the tether 130 on to the drum 180. The ground station 150 includes perch support 170 that extends to support perch panel 176. The aerial vehicle includes a pair of hooks 146 positioned on the lower pylons 143 that extend over and underneath a bar 178 positioned on a top of the perch panel 176. A peg 147 extends from the fuselage 124 of the aerial vehicle and is positioned against the perch panel 176.

The aerial vehicle 120 includes lower rotors 140a positioned on lower pylons 143 that include blades 145 and upper rotors 140b positioned on upper pylons 141 that also includes blades 145. Aerial vehicle also includes a tail 126 extending from the fuselage 124.

Figure 4:
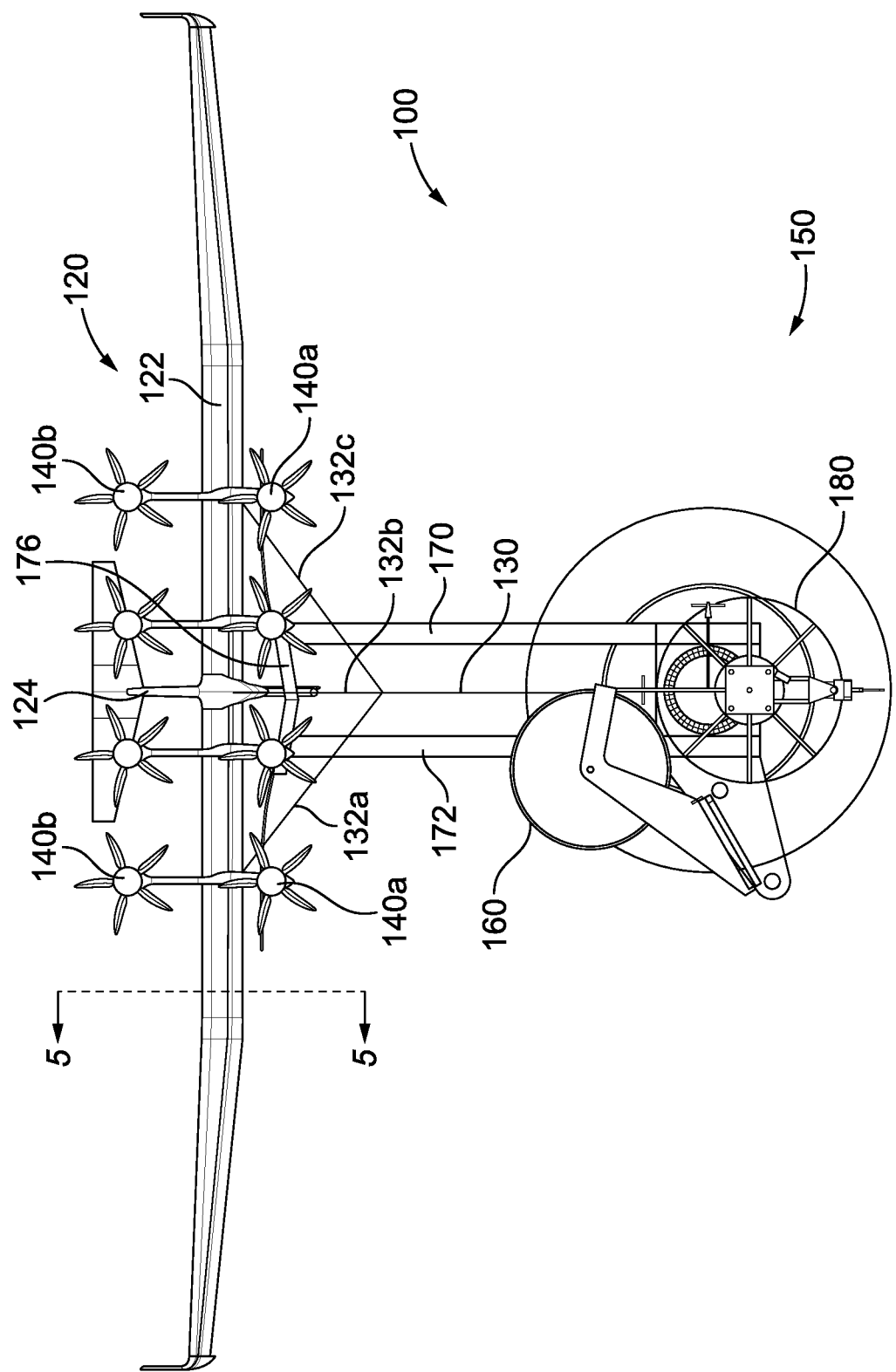
FIG. 4 is a top view of the aerial vehicle 120 shown in FIG. 3 positioned on ground station 150, according to an example embodiment.

FIG. 4 shows a top view of airborne wind turbine system 100 shown in FIG. 3. Tether 130 extends from levelwind 160 and rotatable drum 180 positioned on ground station 150 and attaches to a bridle 132a, 132b, and 132c secured to aerial vehicle 120. The aerial vehicle is positioned on perch panel 176 extending from perch panel supports 170 and 172 extending from ground station 150. The aerial vehicle includes lower rotors 140a and upper rotors 140b attached to wing 122.

3. ILLUSTRATIVE EXAMPLES OF A CROSS SECTION OF AN AIRFOIL

Figure 5:
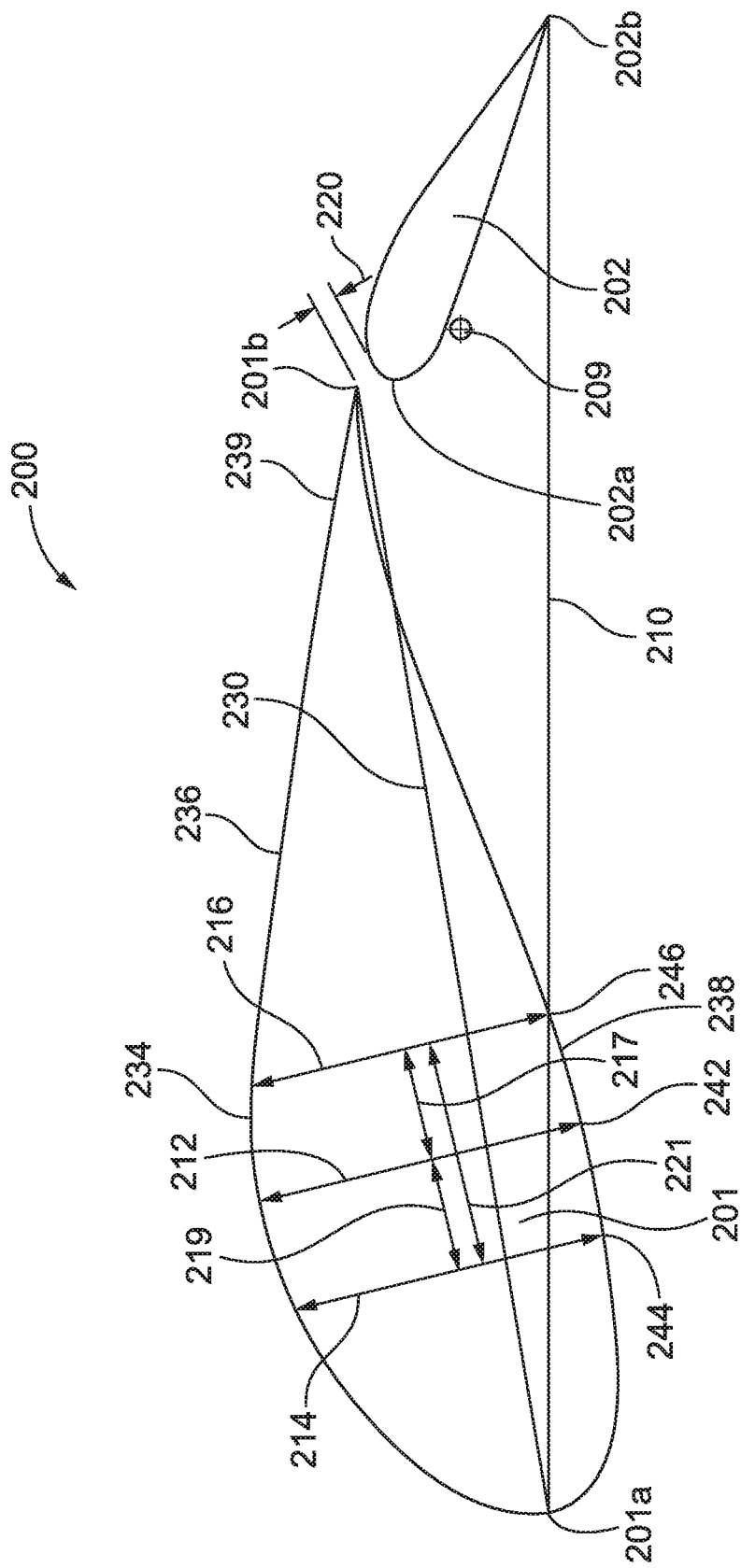
FIG. 5 is a cross-sectional view of airfoil 200 having main wing 201 and trailing element 202 that may be used on aerial vehicle 120 shown in FIGS. 3 and 4 shown in a first flying position, according to an example embodiment.
Figure 6:
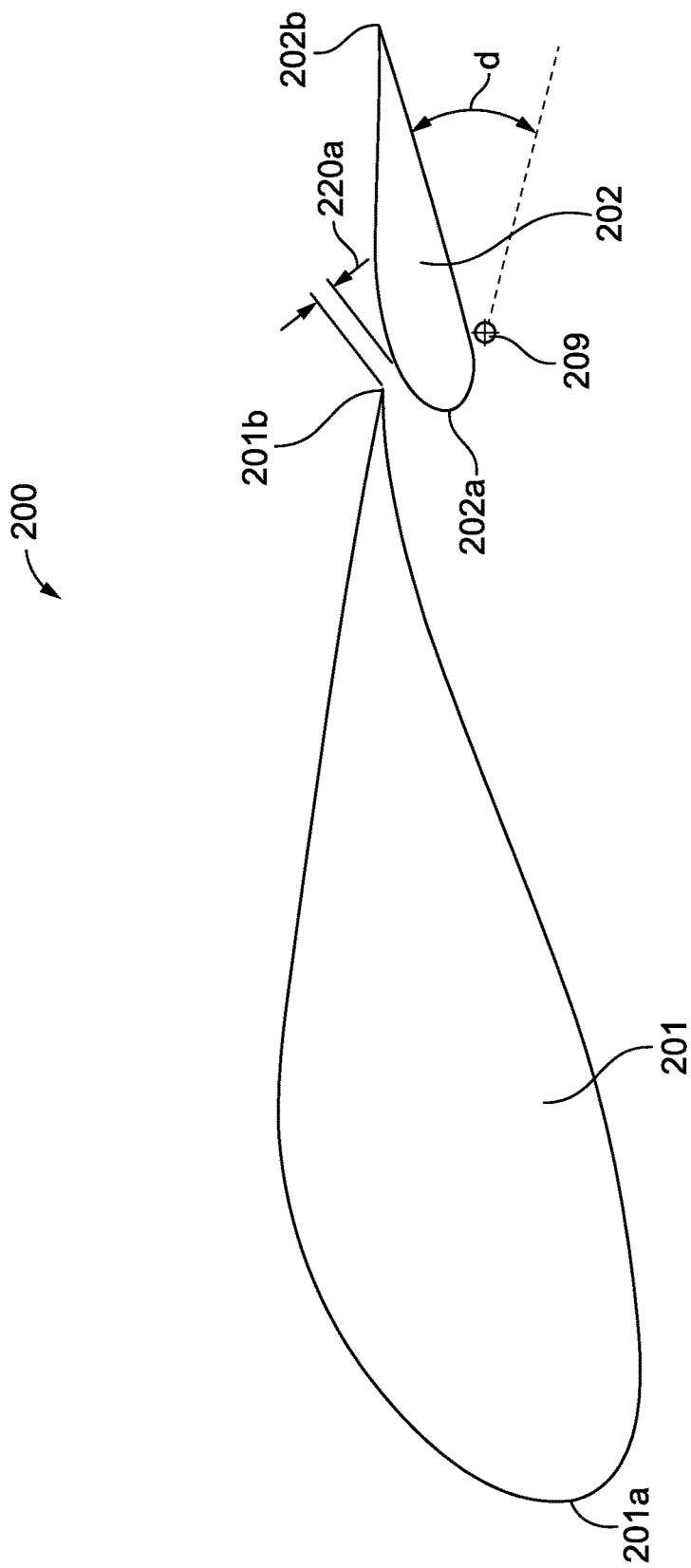
FIG. 6 is a cross-sectional view of airfoil 200 shown in FIG. 5, with the trailing edge 202b of the trailing element 202 rotated 30 degrees about pivot point 209 from the first flying position shown in FIG. 5.
Figure 7:
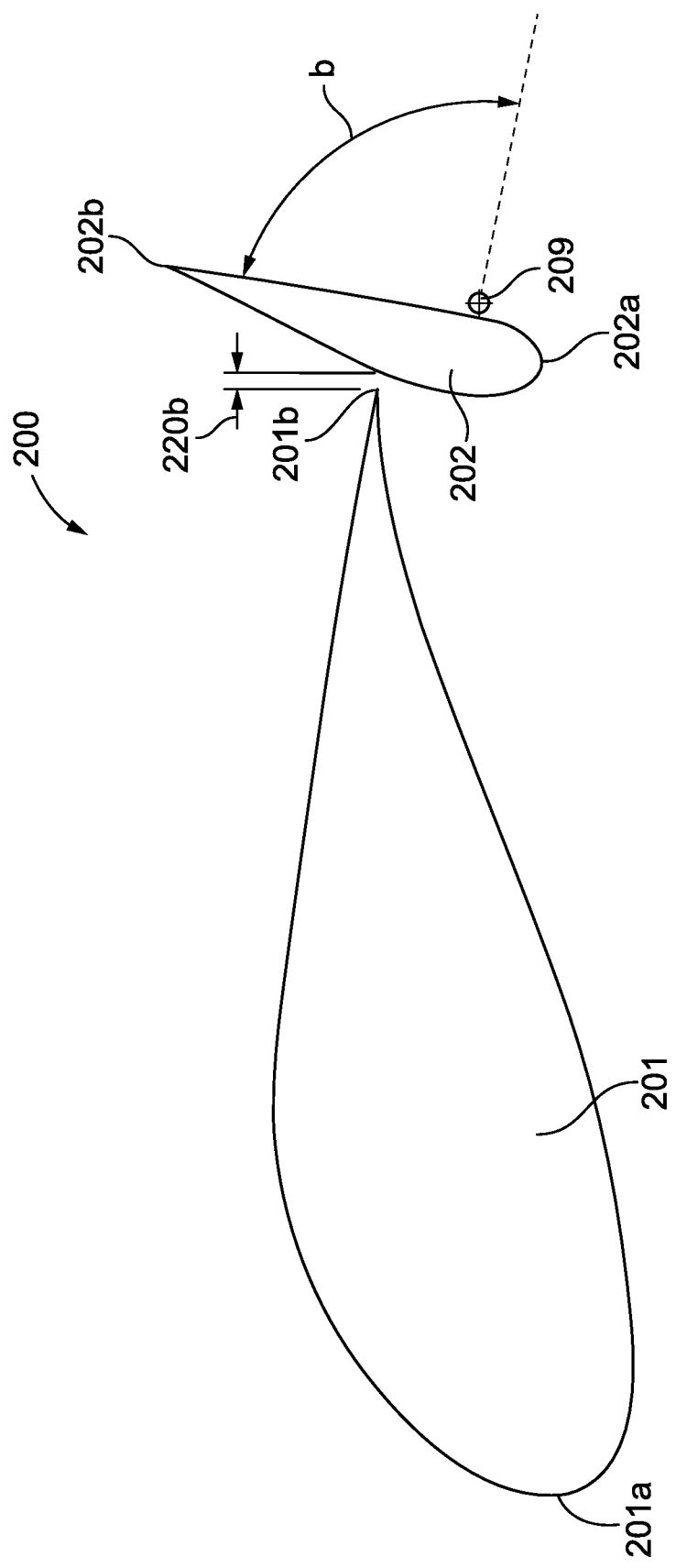
FIG. 7 is a cross-sectional view of airfoil 200 shown in FIG. 5, with the trailing edge 202b of the trailing element 202 rotated 90 degrees about pivot point 209 from the first flying position shown in FIG. 5.
Figure 8:
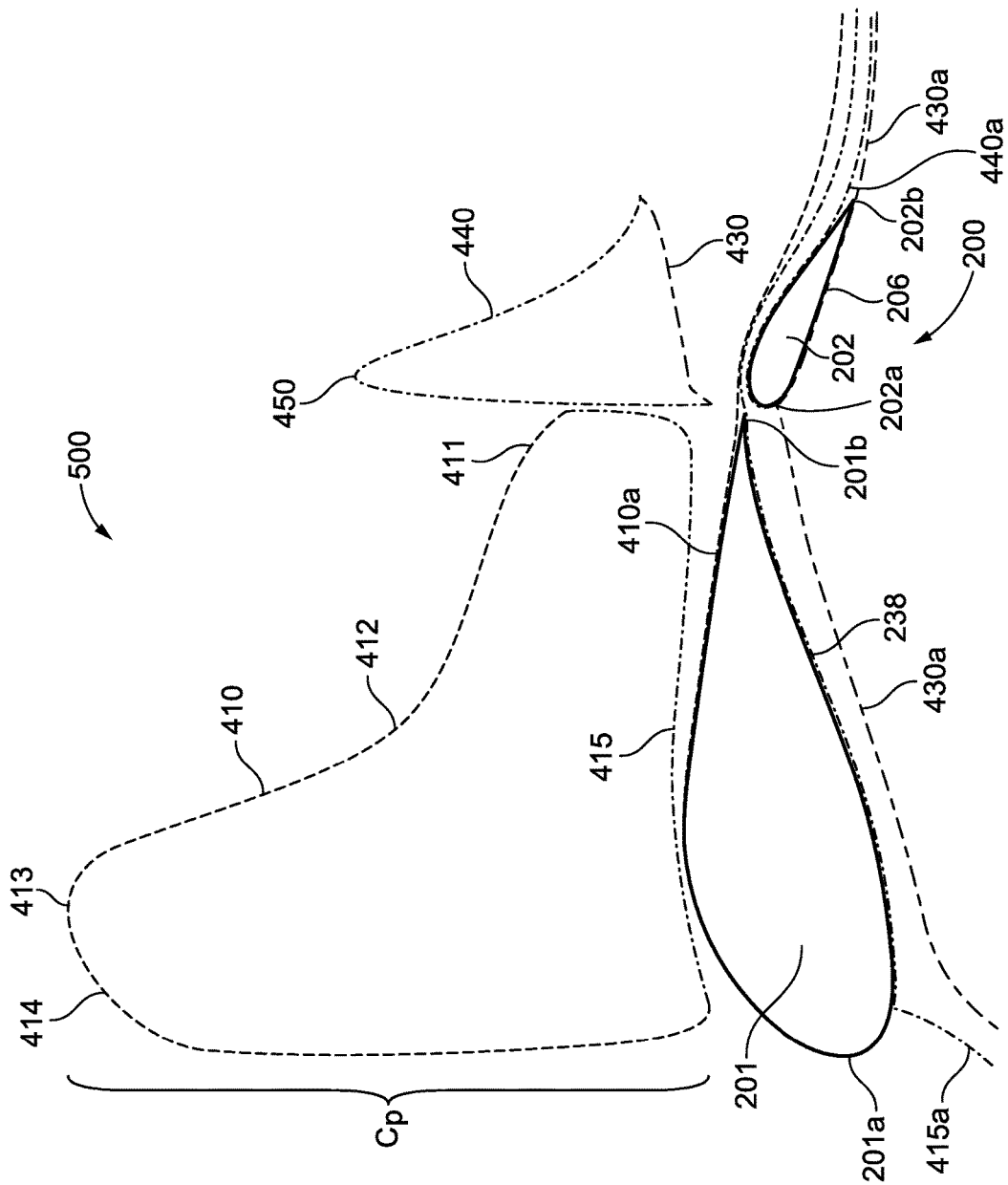
FIG. 8 is a diagram depicting an example pressure distribution 400 for the airfoil 200 shown in a flying position shown in FIG. 5 given at a flight condition near stall showing a vertical pressure coefficient Cp that increases negatively as it extends upward.

FIGS. 5-8 show a cross-sectional view of an airfoil 200 that could be used for wing 122 shown along line 5-5 shown in FIG. 4. In an example embodiment, FIG. 5 is a cross sectional view depicting an embodiment of an airfoil 200 for an airborne wind turbine. The airfoil comprises a main wing 201 and a trailing element 202 shown at an attack angle of 0 degrees based on the unit chord line 210 shown in FIG. 5. Trailing element 202 pivots about a pivot point 209 which is shown located beneath the lower surface of trailing element 202, although in some embodiments the pivot point could be located elsewhere. The main wing 201 preferably has a bulbous leading edge 201a, with accelerated curvature to a transition point 234 positioned on an upper surface of main element 201. At the transition point 234, the curvature of the upper surface reduces suddenly to change the pressure gradient (defined as a $C_P$ value) from a climbing pressure gradient (i.e., more negative $C_p$ values), likely to maintain laminar flow, to a recovering pressure gradient, bringing pressure ($C_p$ value) near the slot gap 220 (located between the trailing edge 201b of main wing 201 and leading edge 202a of trailing element 202a) back to trailing edge (of the main element) stagnation pressures (as shown in FIG. 8). The top surface of main wing 201 includes an early recovery region 236 that is shaped so as to have a highly concave pressure distribution (as shown, for example, in FIG. 8 as section 412) having negative curvature over a segment of the upper surface of the main wing 101. In other embodiments, this recovery region 236 may be flat or convex.

The early recovery region 236 is followed by the final recovery region 239, in which the pressure gradient (shown in FIG. 8) is convex or flat. This combination leads to a progressive stall on the main wing 201 so as to result in a very gradual stall of the main wing 201 while still using a Stratford or another concave pressure distribution for the majority of pressure recovery in the early recovery region 236.

As shown in FIG. 5, the leading edge curvature of the main element 201 is not very high. Referenced to unit chord for the multi-element airfoil, the curvature is generally lower than 20, and certainly below 40 (values of curvature when the airfoil (main and trailing elements) are at unit scale. Therefore, the leading edge is roughly a section of a circle with a radius probably larger than 1/20, and certainly larger than 1/40, of the length of the unit chord length. Thus, the leading edge of the main element 201 may not be considered "sharp." This assists in keeping flow attached both in the high wind, low lift and low wind, high lift cases.

The trailing element 202 comprises a blunt leading edge 202a having a rounded shape resulting in only small pressure spikes at all relevant trailing element or flap angles. In some embodiments, trailing element 202 may be actuated for part of the span of the main wing 201, though need not be actuated. Further, in some embodiments, the trailing element 202 may be attached to the main wing 201 by way of a spring mechanism which reduces (moves the trailing edge up) the angle of the trailing element 202 at high flight speeds. In addition, in some embodiments, the trailing element 202 may be fixed and is not actuated about pivot point 209. Trailing element 202 may be rotated at large angles about pivot point 209, often at angles of 30 or 90 degrees, though also potentially rotated 10 degrees or further downward (i.e., the trailing edge of the trailing element further downward).

As shown in FIG. 5, a chord line 210 extends from the leading edge 201a of main wing 201 to trailing edge 202b of the trailing element 202. In a first flying position (as shown in FIG. 5), the chord line 210 does not intersect the trailing element 202. The airfoil 200 generates a high level of maximum lift. In an example embodiment, the maximum lift coefficient in a Reynolds number of 3 million and a mach number of 0.2 is between 3.3 and 4, while in some embodiments the maximum lift coefficient is closer to 2.2 to 2.7.

The main element 201 also comprises a lower surface bulge or spar bulge depicted generally in the area 238, which allows for a thicker spar to be located in the main wing 201 while not significantly reducing the lift of the airfoil 200. The lower surface bulge 238 is also shaped so as to allow a very low negative lift coefficient when the trailing elements 202 are deflected upwards. The maximum thickness (as measured perpendicular to a chord line 230 of the main element 201) of main element 201 is shown at line 212 extending from point 242 and may be 15-28% of the length of unit chord line 210. In some embodiments the maximum thickness may be 17-26% of the length of unit chord line 210, and in an example embodiment may be 19-21% of the length of unit chord line 210.

The spar bulge 238 is shaped so that at line 216 extending from point 246 of main wing 201 parallel to maximum thickness line 212, a thickness of main element 201 is 95% of the maximum thickness at line 212, where line 216 is located at a position 43% of chord line 230 of main wing 201. A line 214 is extending from point 244 parallel to maximum thickness line 212 that is equidistant from the maximum thickness 212 as line 216 (i.e., the distance 219 between line 214 and maximum thickness 212 is equal to the distance 217 between line 216 and maximum thickness 212). Distance 221 represents the difference between lines 214 and 216 which are both 95% of the maximum thickness 212. Distance 221 is ⅔ of the distance of maximum thickness 212. The thickness of lines 214 and 216 are 95% of the maximum thickness 212 of main wing 201.

FIG. 6 is a cross sectional view of airfoil 200 shown in FIG. 5, where the trailing element 202 is deflected upwards at an angle d of 30 degrees by moving trailing end 202b upwards. The configuration shown in FIG. 6 is a configuration that might be used in high wind flight. By having an airfoil which maintains attached flow and no sharp curvature discontinuities when operating at a with the trailing element deflected upwards at an angle d of 30 degrees, the main wing 201 may have a low lift coefficient while maintaining the propellers pointing into the wind with no change in angle of attack. The pivot point 209 is selected such that the moment about it is very small in comparison to the forces on the airfoil 200, and the chord of the main wing 201 and of the trailing element 202. This allows a very small servo to be used to actuate the trailing element 202, and reduced power and torque may be used to move the trailing element 202. Pivot point 209 may be located such that a slot gap 220a between the trailing end 201b of main element 201 and a leading edge 202a of trailing element 202 does not significantly change during small deflections (defined as from 0-40 degrees) though in some embodiments it increases as the trailing element 102 is deflected upwards. For example, the width of the slot gap 220 in FIG. 5 is the same as the width of slot gap 220a in FIG. 6.

As used herein the base reference angle is based on the position of the trailing element 202 in a first position shown in FIG. 5 at a 0 angle of attack, and the deflection angle is based on a line drawn from the pivot point 209 to the trailing edge 202b of trailing element 202.

FIG. 7 is another cross sectional view of airfoil 200 shown in FIGS. 5 and 6 depicting an airfoil 200 with trailing element 202 deflected upwards an angle b that is about 90 degrees. When the flying wind turbine is hovering, it is important that the main wing 201 not generate lift force, and only drag force. In some embodiments, slot gap 220b may be closed when the trailing element 202 is deflected up 90 degrees, while in others it is left slightly open. In this configuration, with slot gap 220b open, it is hard to generate lift with the airfoil 200 because the flow becomes detached. In this example, the width of slot gap 220b is similar to the width of slot gap 220 shown in FIG. 5, and slot gap 220a shown in FIG. 6.

When the flying wind turbine transitions from hovering flight to transition in climb, it is desirable to change the airflow over the airfoil 200 from detached to attached airflow. To accomplish this, the trailing element 202 may be deflected from a highly negative (up) angle as shown in FIG. 7 to an angle as depicted in FIG. 5. The movement of trailing member 201 back to its position shown in FIG. 5 quickly moves the flow from being detached to being attached, reducing the amount of disturbance force potentially caused by the main wing 201 unstalling asymmetrically or inconsistently. The reverse procedure is followed when transitioning from crosswind power generating flight to hovering flight.

FIG. 8 is a diagram depicting an example pressure distribution 400 for the airfoil 200 shown in the flying position shown in FIG. 5 showing a vertical pressure coefficient $C_p$ that increases negatively as it extends upward plotted against the unit chord length of the airfoil. The pressure distribution 500 is given at a flight condition near stall. The main element pressure 410 represents the pressure (defined as a $C_p$ value) over the upper surface of the main wing 201 along line 410a, whereas main element pressure 415 represents the pressure (also defined as a $C_p$ value) beneath lower surface of main wing 201 along line 415a. The main element pressure 410 increases consistently from leading edge 201a of main wing 201 with a positive pressure gradient 414 having a rounded shape until it reaches a pressure recovery at transition point 413 where the flow becomes turbulent. The transition point to pressure recovery in some embodiments may be targeted at an exact location along the unit chord, or may be fixed by a sharp change to pressure recovery. The early pressure recovery 412 is shown as concave and holds the entirety of the boundary layer over this region at a similar margin to stall. The later pressure recovery 411 is shown as convex or flat, and leaves the further aft portions of the boundary layer closer to stall than those further forward. As lift is lost from the main wing 201 when separation begins, the boundary layer thickness exiting the main element 201 increases and results in a portion of offbody stall, resulting in a slow stall to the combined airfoil 200.

The trailing element pressure 440 represents the pressure (defined as value of $C_p$) over the upper surface of the trailing element 202 along line 440a, whereas trailing element pressure 430 represents the pressure (defined as a value of $C_p$) beneath lower surface of trailing element 202 along line 430a. The lift off of trailing element 202 is concentrated near the leading edge 202a resulting in a triangular or near triangular pressure distribution 450. The pressure distribution 500 concentrates lift near the main wing 201, both reducing flap moments about the pivot point 209, and increasing the benefit of lift from element 202 on the pressure on the main wing element 201, through reductions in the trailing edge stagnation pressure. In addition, by having a reflexed or low camber shape, trailing element 202 has a consistent center of effort over its range of motion, while flow is attached. This allows for a single pivot point 209 to rotate the trailing element 201 with consistent or small torques on the actuator rotating the trailing element 201. In some embodiments, the trailing element is 202 is more cambered or less reflexed, but pivot point 209 is moved upward to result in a consistent or small torque at the pivot point 209 over a range of trailing element (flap) deflections.

The example embodiments are directed to a multi-element airfoil 200 having a main wing 201 and trailing element 202 that may be used on a flying wind turbine. The design of the airfoil 200 allows for a much smaller wing to be used, causing the forces in the parked condition to go down, and causing the forces in hover to go down. The planform area presented to the wind flow direction is reduced versus a typical wing design. These factors combine to reduce the structural mass of the wing and increase controllability. The trailing element 202 can move over a large range of angles while maintaining attached flow. This allows the airfoil 200 to fly at vastly varying lift coefficients, which is highly valuable in high winds. Airfoil 200 may operate at a 10-15 degree angle of attack for maximum lift, and may provide for high lift in low to moderate winds and low lift and more drag in high winds.

The placement of the transition point 413 on the main wing 201 results in an appropriate shape to fit the main wing spar near the center of effort of the airfoil 200, optimizing both structural and aerodynamic design. The lower surface bulge 238 is placed at its location for this reason.

The design of airfoil 200 makes for a smaller, higher performance wing capable of generating more power than lower zeta designs. The design of airfoil 200 also allows for a large amount of control over the forces on the main wing 201 and increases the controllability of the airfoil 200 in hover.

Figure 9:
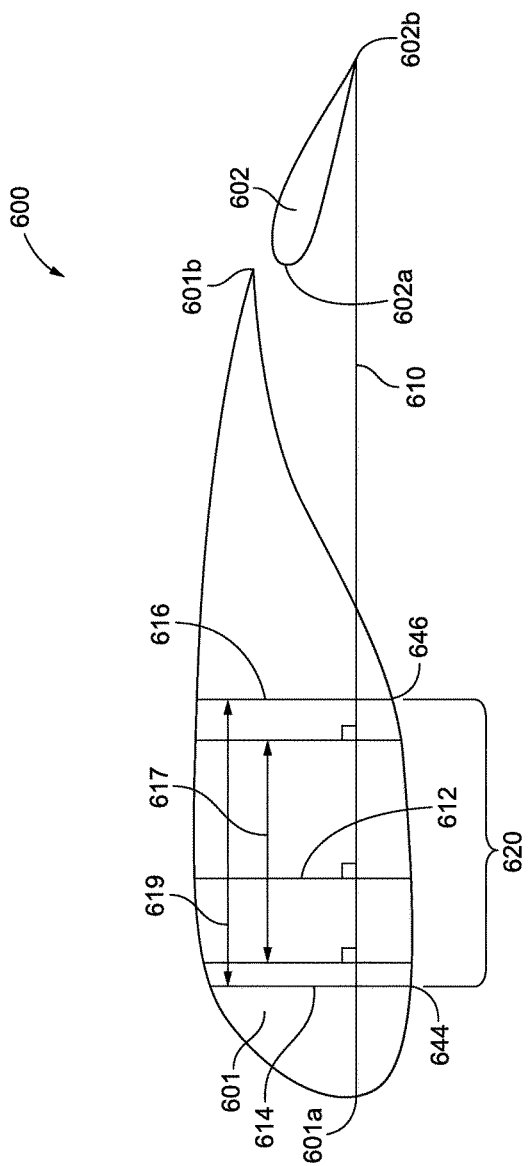
FIG. 9 is a cross-sectional view of airfoil 600 which includes main element 601 and trailing element 602, according to an example embodiment.

FIG. 9 is a cross-sectional view of airfoil 600 which include main element 601 and trailing element 602, according to an example embodiment. Main element 601 includes a leading edge 601a and a trailing edge 601b and trailing element 602 includes a leading edge 602a and a trailing edge 602b. A chord line of airfoil 600 extends from leading edge 601a of main element 600 to the trailing edge of 602b. Similar to FIG. 5, main element 601 includes a spar bulge extending generally between bracket 620 and points 644 and 646. The spar bulge may be placed behind the bridle attachment points so as to better capture that structure.

A maximum thickness measured at a point perpendicular to chord line 610 is shown at line 612. In this example, the maximum thickness is around 21 percent of the length of chord line 610. In some embodiments the thickness may be 15-28% of the length of the chord line. The spar bulge extends to such a degree that over 20% of the overall length of the chord line has a thickness that is 95% of the maximum thickness at line 612. This area of 95% thickness extends along the length of line 617 and may extend between 15-25% of overall length of chord line 610.

Furthermore, the spar bulge extends to such a degree that over 29% of the overall length of the chord line has a thickness that is 90% of the maximum thickness at line 612. This area of 90% thickness extends along the length of line 619 between lines 614 and 616 and may extend between 25-35% of the overall length of chord line 610. Furthermore, line 616 is located at position that is 40% of the length of chord line 610.

Figure 10:
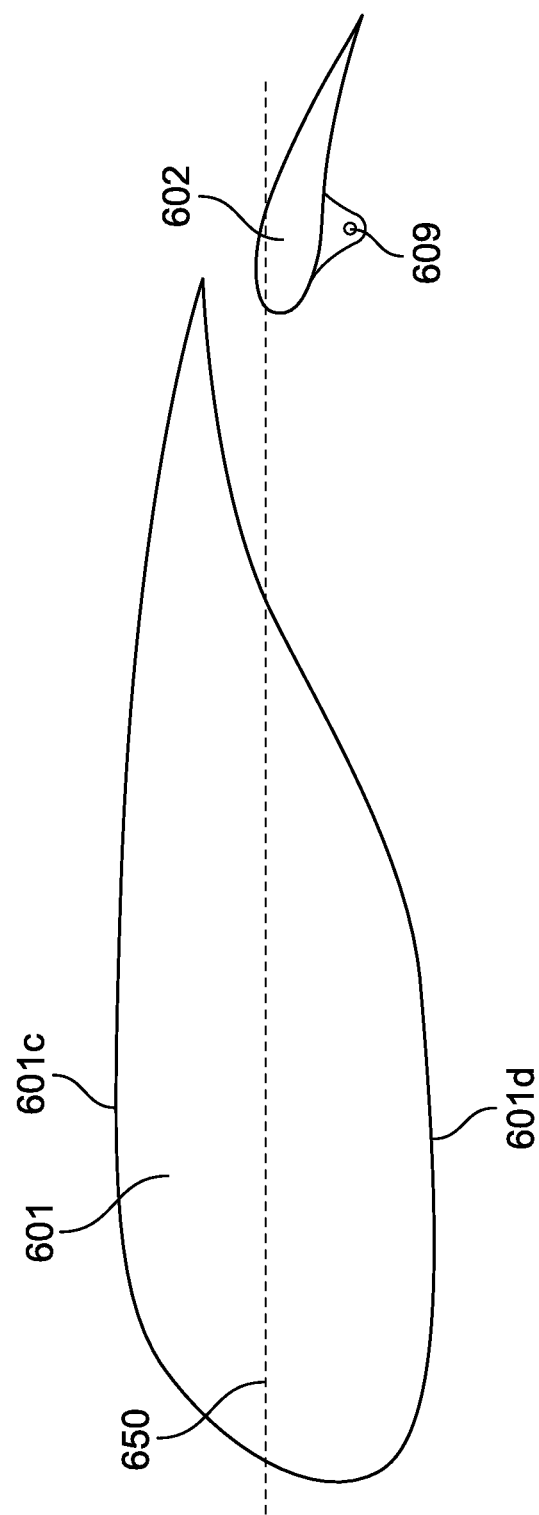
FIG. 10 shows the airfoil 600 shown in FIG. 9 with trailing element 602 positioned on the axis of bending 650 of main element 601.

FIG. 10 shows the airfoil 600 shown in FIG. 9 with trailing element 602 positioned on the axis of bending 650 of main element 601. The positioning of the trailing element 602 on or near the axis of bending 650 reduced the play required in the hinge point 609 of trailing element 602.

Figure 11:
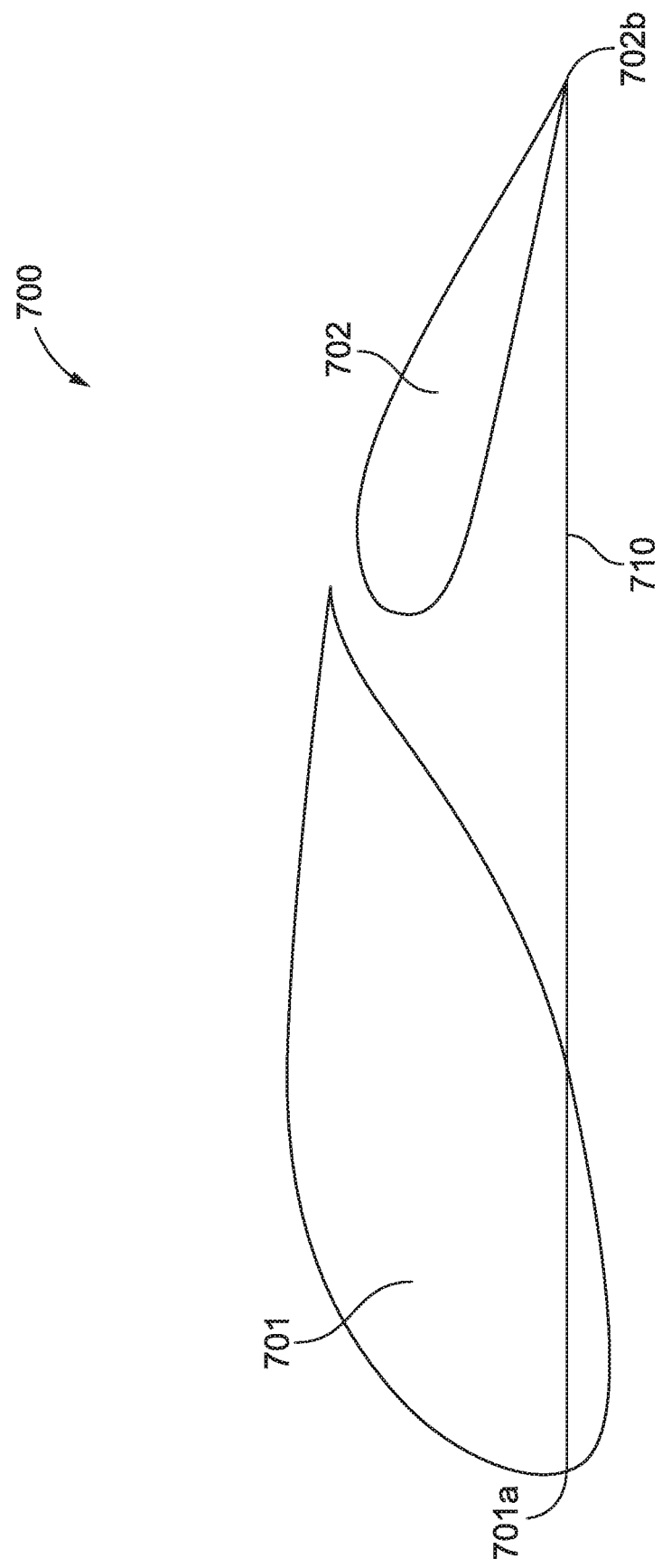
FIG. 11 is a cross-sectional view of the airfoil 600 shown in FIG. 9 near the wing tip of the airfoil.

FIG. 11 is a cross-sectional view of the airfoil 600 shown in FIG. 9 near the wing tip of the airfoil depicted as cross section 700. Referring back to FIG. 9, the trailing element 202 may not constitute a large percentage of the length of the chord line 610 near the center of the wing, and may be on the order of 20% of the chord length 610 at the center of the wing. In the planform of the wing, a constant chord trailing element may be used, so that the inboard and outboard trailing elements can all be identical. As a result, as depicted in FIG. 11, the cross section of the outboard portion of the airfoil 600 near the wingtip is shown as 700 where the trailing element 702 has a much larger length relative to the overall length of chord line 710 extending between the leading edge 701a of the main element 701 and the trailing edge 702b of the trailing element 702. In some embodiments the trailing element may constitute 40 percent of the overall length of chord line 710.

Figure 12:
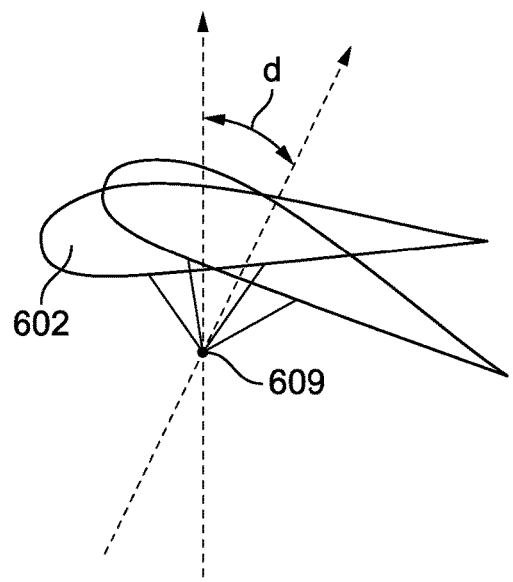
FIG. 12 is view of trailing element 602 shown in FIG. 9 pivoting about pivot point 609.

FIG. 12 is view of trailing element 602 shown in FIG. 9 pivoting about pivot point 609. As illustrated in FIG. 12, the trailing element 602 used for the flaps are only lightly cambered so as they are deflected such that center of force stays near the center of rotation and limits forces on the wing servos that are used to control the angle of the flaps, thereby making it more inexpensive and low mass to turn the wing aerodynamically as opposed to using extra rotor forces.

Figure 13:
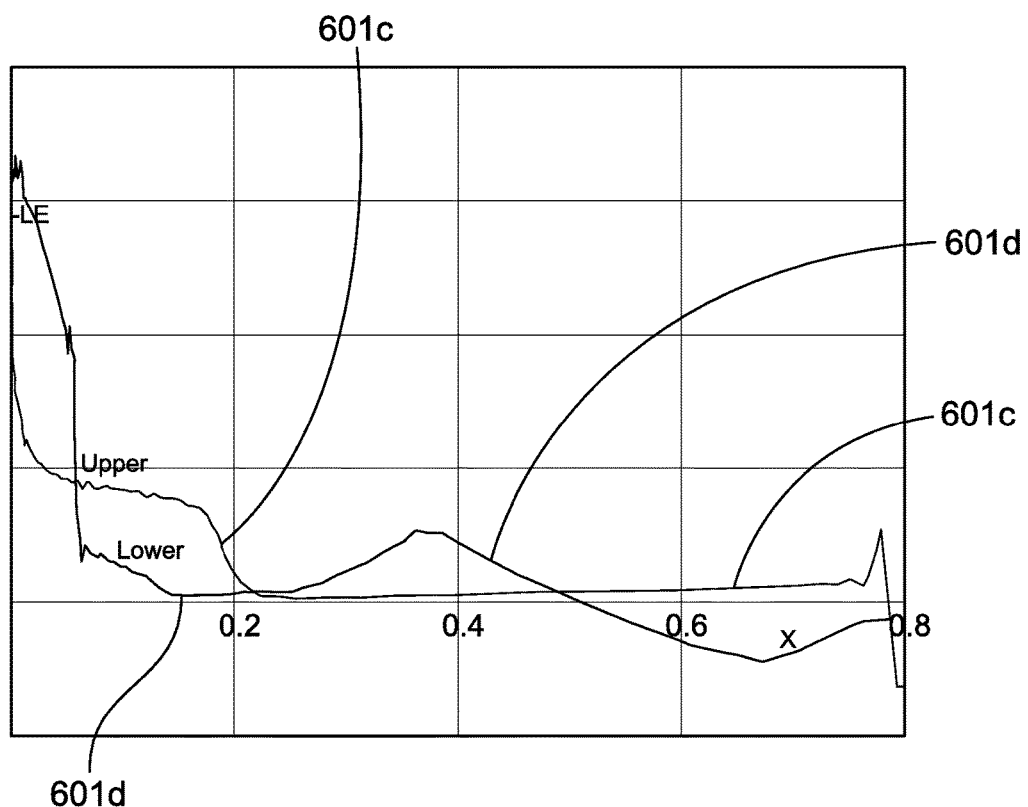
FIG. 13 is a graph plotting the curvature of the upper surface 601c and the lower surface 601d of the main element 601.

FIG. 13 is a graph plotting the curvature of the upper surface 601c and the lower surface 601d of the main element 601. It is desirable that the bottom of the airfoil maintains an attached flow. The designs depicted in the foregoing Figures are designed so that the bottom does not have a sharp nose such that the airfoil will lose attached flow. FIG. 13 shows a line 601c representing the curvature of the top of main element 601 and a line 601d representing the curvature of the bottom of main element 601.

The airfoil shown in FIGS. 5 and 9 are designed for relatively low pitching moment. Such a configuration helps for keeping the blade from twisting at high speeds, or requiring a spar far enough back that it cannot be neatly packaged into the airfoil. The pitching moment of the airfoil may be sufficiently low that at operating C_L, the center of pressure is within about 10% of unit chord length from the portion of the airfoil that has been thickened for structure (e.g. the area between lines 214 and 216 shown in FIG. 5 or between bracket 620 in FIG. 9). The pitching moment may be about 0.3, and the C_L may be around 2.5 in operating conditions, so the center of pressure may be located at 0.37 of the unit chord, which is about the center of the bulge on the lower surface of the airfoil.

4. CONCLUSION

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An airfoil for an airborne wind turbine comprising:
 a main wing adapted for attachment to an electrically conductive tether having a first end adapted for attachment to the main wing and a second end adapted for attachment to a ground station, where a trailing edge of the main wing is formed at an intersection of a top surface and a curvilinear bottom surface of the main wing;
 a trailing element positioned behind the main wing and pivotable about a pivot point positioned beneath the trailing element;
 wherein a chord line of the airfoil has a length that is measured from the leading edge of the main wing to a trailing edge of the trailing element;
 wherein when the main wing and trailing element are positioned in a first flying position, a slot gap exists between a trailing edge of the main wing and the leading edge of the trailing element;
 wherein the main wing includes a chord line having a length measured from the leading edge of the main wing to the trailing edge of the main wing;
 wherein the main wing has a maximum thickness that is 17-26% of the length of the chord line of the airfoil; and
 wherein a length of the main wing extending from a point that is located at 5-11% along the length of the chord line of the airfoil to a point that is located at 40% along the length of the chord line of the airfoil has a thickness that is 90% or more of the maximum thickness of the main wing.

2. The airfoil of claim 1, wherein when the trailing edge of the trailing element is rotated about the pivot point 30 degrees from the first flying position a slot gap exists between a trailing edge of the main wing and the leading edge of the trailing element, the slot gap having a width that is the same as the width of the slot gap when the airfoil is in the first flying position.

3. The airfoil of claim 1, wherein when the trailing edge of the trailing element is rotated about the pivot point 40 degrees from the first flying position a slot gap exists between a trailing edge of the main wing and the leading edge of the trailing element, the slot gap having a width that is the same as the width of the slot gap when the airfoil is in the first flying position.

4. The airfoil of claim 1, wherein the chord line of the airfoil does not intersect the trailing element, other than the trailing edge of the trailing element, when the airfoil is in the first flying position.

5. The airfoil of claim 1, wherein the pivot point is located beneath a lower surface of the trailing element.

6. The airfoil of claim 1, wherein the main wing has a maximum thickness that is 19-21% of the length of the chord line of the airfoil.

7. The airfoil of claim 1, wherein a pressure distribution of the airfoil at a near-stall flight condition is such that the pressure profile expressed as $C_p$ of an upper surface of the main wing increases from the leading edge of the main wing towards a trailing edge of the main wing with a positive pressure gradient having a curved shape until it reaches a pressure recovery at a transition point, and an early pressure recovery is concave and a later pressure recovery is convex or flat; and
 wherein a pressure profile expressed as $C_p$ of an upper surface and a lower surface of the trailing element has a generally triangular pressure distribution with a peak near the leading edge of the trailing element.

8. The airfoil of claim 1, wherein a secondary thickness of the main wing at a point that is located at a position that is 43% of the length of the chord line of the main wing is 95% or more of the maximum thickness of the main wing closer to the leading edge of the main wing, and, wherein a tertiary thickness of the main wing equidistant from the maximum thickness of the main wing as the secondary thickness is also 95% or more of the maximum thickness of the main wing.

9. The airfoil of claim 1, wherein over 20% of the overall length of the chord line of the airfoil has a thickness that is 95% of the maximum thickness of the main wing.

10. The airfoil of claim 1, wherein a length of the main wing extending from a point that is located at 11% along the length of the chord line of the airfoil to a point that is located at 40% along the length of the chord line of the airfoil has a thickness that is 90% or more of the maximum thickness of the main wing.

11. The airfoil of claim 1, wherein a length of the main wing extending from a point that is located at 5% along the length of the chord line of the airfoil to a point that is located at 40% along the length of the chord line of the airfoil has a thickness that is 90% or more of the maximum thickness of the main wing.

12. An airfoil for an airborne wind turbine comprising:
a main wing adapted for attachment to an electrically conductive tether having a first end adapted for attachment to the main wing and a second end adapted for attachment to a ground station, where a trailing edge of the main wing is formed at an intersection of a top surface and a curvilinear bottom surface of the main wing;
a trailing element positioned behind the main wing and pivotable about a pivot point;
wherein a chord line of the airfoil has a length that is measured from a leading edge of the main wing to a trailing edge of the trailing element;
wherein when the main wing and trailing element are positioned in a first flying position a slot gap exists between a trailing edge of the main wing and the leading edge of the trailing element;
wherein the pivot point is located beneath a lower surface of the trailing element;
wherein the main wing has a maximum thickness that is 17-26% of the length of the chord line of the airfoil; and
wherein a length of the main wing extending from a point that is located at 5-11% along the length of the chord line of the airfoil to a point that is located at 40% along the length of the chord line of the airfoil has a thickness that is 90% or more of the maximum thickness of the main wing.

13. The airfoil of claim 12, wherein when the trailing edge of the trailing element is rotated about the pivot point 30 degrees from the first flying position a slot gap exists between a trailing edge of the main wing and the leading edge of the trailing element, the slot gap having a width that is the same as the width of the slot gap when the airfoil is in the first flying position.

14. The airfoil of claim 12, wherein when the trailing edge of the trailing element is rotated about the pivot point 40 degrees from the first flying position a slot gap exists between a trailing edge of the main wing and the leading edge of the trailing element, the slot gap having a width that is the same as the width of the slot gap when the airfoil is in the first flying position.

15. The airfoil of claim 12, wherein the chord line does not intersect a portion of the trailing element, other than the trailing edge of the trailing element, when the airfoil is in the first flying position.

16. The airfoil of claim 12, wherein a length of the main wing extending from a point that is located at 11% along the length of the chord line of the airfoil to a point that is located at 40% along the length of the chord line of the airfoil has a thickness that is 90% or more of the maximum thickness of the main wing.

17. The airfoil of claim 11, wherein a length of the main wing extending from a point that is located at 5% along the length of the chord line of the airfoil to a point that is located at 40% along the length of the chord line of the airfoil has a thickness that is 90% or more of the maximum thickness of the main wing.

* * * * *